United States Patent
Ukai (10) Patent No.: US 10,459,857 B2
(45) Date of Patent: Oct. 29, 2019

(54) DATA RECEIVING APPARATUS, DATA TRANSMISSION AND RECEPTION SYSTEM, AND CONTROL METHOD OF DATA TRANSMISSION AND RECEPTION SYSTEM

(71) Applicant: FUJITSU LIMITED, Kawasaki-shi, Kanagawa (JP)

(72) Inventor: Megumi Ukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/240,840

(22) Filed: Jan. 7, 2019

(65) Prior Publication Data
US 2019/0243786 A1 Aug. 8, 2019

(30) Foreign Application Priority Data
Feb. 2, 2018 (JP) .................................. 2018-017256

(51) Int. Cl.
G06F 13/16 (2006.01)
G06F 13/36 (2006.01)
H04L 29/06 (2006.01)

(52) U.S. Cl.
CPC .......... *G06F 13/1673* (2013.01); *G06F 13/36* (2013.01); *H04L 69/22* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,917,658 B2* | 3/2011 | Pettey | H04L 12/4633 710/15 |
| 8,819,306 B2* | 8/2014 | Ajanovic | G06F 13/124 710/29 |
| 9,432,298 B1* | 8/2016 | Smith | H04L 49/9057 |
| 2010/0054268 A1* | 3/2010 | Divivier | H04L 49/90 370/412 |
| 2014/0136680 A1* | 5/2014 | Joshi | H04L 43/026 709/224 |

FOREIGN PATENT DOCUMENTS

| JP | 61-246848 | 11/1986 |
|---|---|---|
| JP | 05-298144 | 11/1993 |
| JP | 2004-206425 | 7/2004 |

* cited by examiner

*Primary Examiner* — Michael Sun
(74) *Attorney, Agent, or Firm* — Fujitsu Patent Center (57) ABSTRACT

A data receiving apparatus includes: a memory; and a processor coupled to the memory and the processor configured to: extract reception data, a header of a transaction layer packet, and a data link layer packet which are included in a received reception signal; store the data link layer packet in a buffer; store the header of the transaction layer packet and the data link layer packet in a history storage; write the data link layer packet to the buffer when the header of the transaction layer packet and the data link layer packet are simultaneously acquired; write the data link layer packet stored in the buffer to the history storage when the header of the transaction layer packet and the data link layer packet is not acquired or when the data link layer packet is acquired without acquiring the header of the transaction layer packet.

20 Claims, 11 Drawing Sheets

DATA RECEIVING APPARATUS, DATA TRANSMISSION AND RECEPTION SYSTEM, AND CONTROL METHOD OF DATA TRANSMISSION AND RECEPTION SYSTEM

CROSS-REFERENCE TO RELATED APPLICATION

This application is based upon and claims the benefit of priority of the prior Japanese Patent Application No. 2018-17256, filed on Feb. 2, 2018, the entire contents of which are incorporated herein by reference.

FIELD

The embodiments discussed herein are related to a data receiving apparatus, a data transmission/reception system, and a control method of the data transmission/reception system.

BACKGROUND

It has been known that various pieces of data are stored as history information for the purpose of, for example, storing an operation history of an information processing circuit, storing an execution history of a program in a program development apparatus, and recording failure information in an information processing unit.

Related technologies are disclosed in, for example, Japanese Laid-open Patent Publication Nos. 61-246848, 2004-206425, and 05-298144.

SUMMARY

According to one aspect of the embodiments, a data receiving apparatus includes: a memory; and a processor coupled to the memory and the processor configured to: extract reception data, a header of a transaction layer packet, and a data link layer packet which are included in a received reception signal; store the data link layer packet in a buffer; store the header of the transaction layer packet and the data link layer packet in a history storage; write the data link layer packet to the buffer when the header of the transaction layer packet and the data link layer packet are simultaneously acquired; write the data link layer packet stored in the buffer to the history storage when the header of the transaction layer packet and the data link layer packet is not acquired or when the data link layer packet is acquired without acquiring the header of the transaction layer packet.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

DESCRIPTION OF EMBODIMENTS

A communication standard called a PCI Express standard (hereinafter, also referred to as "PCIe") established by the PCI-SIG has been known. The PCIe complements the drawbacks of the PCI (peripheral component interconnect) bus established by the PCI-SIG, and is capable of implementing a data transfer rate which is 30 times higher than the data transfer rate of the PCI bus.

As for the physical layer of the PCIe, while a lane width of 8 lanes has generally been adopted in the related art, a lane width of 16 lanes started to have been adopted in order to increase the data transfer rate.

In order to store a reception history of receiving a reception signal according to the PCIe standard, each of a header of a transaction layer packet and a data link layer packet which are included in the reception signal may be stored in a history unit. When the lane width is 8 lanes, both the header of the transaction layer packet and the data link layer packet have never been input to the history unit at the same time due to the data structure. However, when the lane width becomes 16 lanes, there is a concern that both the header of the transaction layer packet and the data link layer packet may be input to the history unit at the same time.

An embodiment of the present disclosure provides a data receiving apparatus that includes a history unit capable of storing both the header of the transaction layer packet and the data link layer packet which are input at the same time.

Hereinafter, a data receiving apparatus, a data transmission/reception system, and a control method of the data transmission/reception system according to embodiments will be described with reference to the accompanying drawings. However, the technical scope of the present disclosure is not limited to the embodiments.

Outline of Data Receiving Apparatus According to Embodiments

An information processing unit according to the embodiments includes a PCI Express receiving unit and a history unit. The PCI Express receiving unit receives a reception signal based on the PCI Express, and extracts reception data, a header of a transaction layer packet, and a data link layer packet which are included in the reception signal. The history unit includes a buffer unit that temporarily stores the data link layer packet, a history storage unit that stores the header of the transaction layer packet and the data link layer packet, and a processing unit. When the header of the transaction layer packet and the data link layer packet are acquired from the PCI Express receiving unit at the same time, the processing unit writes the data link layer packet to the buffer unit. When neither the header of the transaction layer packet nor the data link layer packet is acquired, the processing unit writes the data link layer packet stored in the buffer unit, to the history storage unit. Further, when only the data link layer packet is acquired without acquiring the header of the transaction layer packet, the processing unit writes the data link layer packet stored in the buffer unit, to the history storage unit.

Since the information processing unit according to the embodiments includes the buffer unit capable of writing the data link layer packet, it is possible to store both the header of the transaction layer packet and the data link layer packet which are acquired at the same time.

Data Receiving Apparatus According to First Embodiment

Figure 1A:
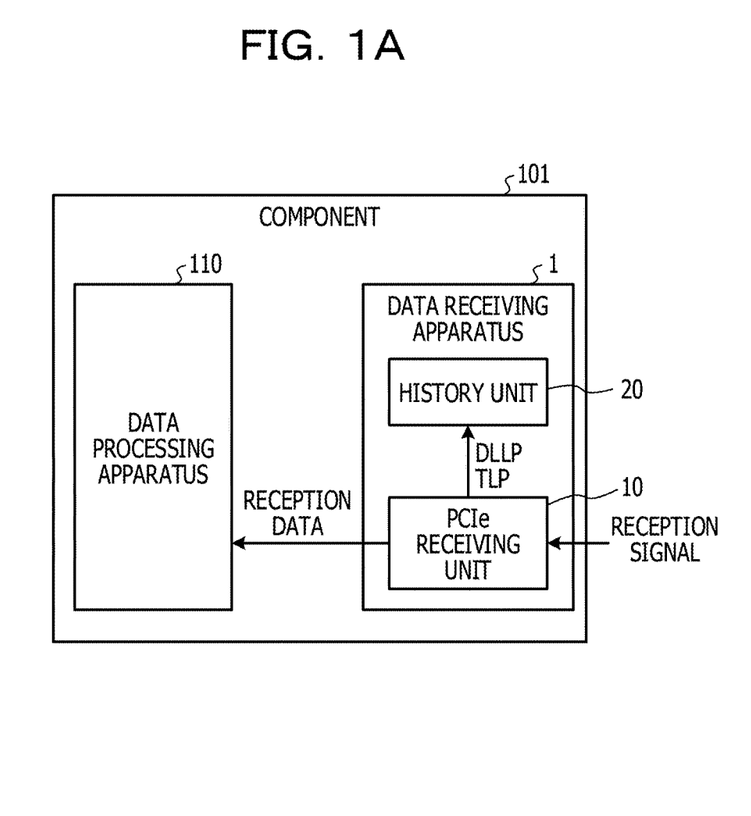
FIG. 1A is a block diagram of a component equipped with a data receiving apparatus according to a first embodiment.
Figure 1B:
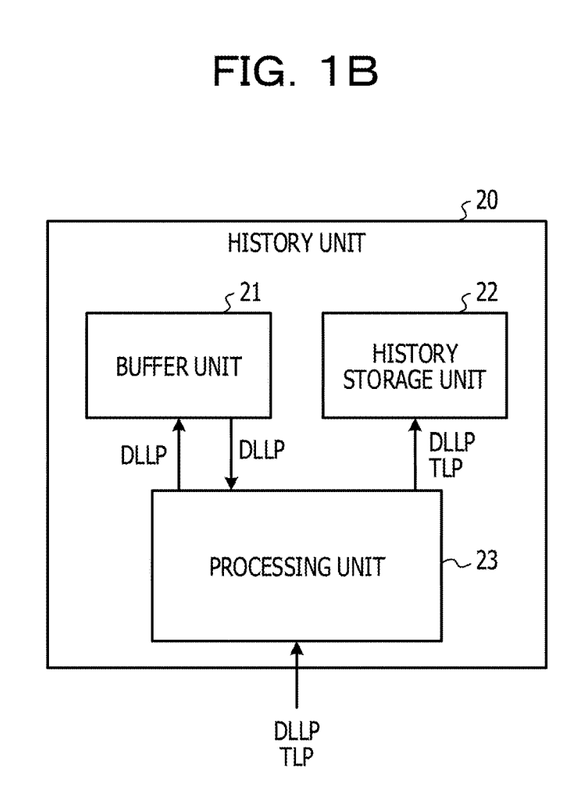
FIG. 1B is a block diagram of a history unit included in the data receiving apparatus illustrated in FIG. 1A.

FIG. 1A is a block diagram of a component equipped with a data receiving apparatus according to a first embodiment, and FIG. 1B is a block diagram of a history unit included in the data receiving apparatus illustrated in FIG. 1A.

A component 101 includes a data receiving apparatus 1 and a data processing apparatus 110 that executes a predetermined process on reception data corresponding to a reception signal received by the data receiving apparatus 1. The component 101 is an end point in an example, and a root complex of a host in another example.

The data receiving apparatus 1 includes a PCI Express receiving unit 10 and a history unit 20. The PCI Express receiving unit 10 receives a reception signal according to the PCI Express standard, and extracts reception data, a header of a transaction layer packet, and a data link layer packet which are included in the reception signal. Hereinafter, the header of the transaction layer packet will also be referred to as TLP, and the data link layer packet will also be referred to as DLLP. Since the operation and function of the PCI Express receiving unit 10 are well-known, detailed descriptions thereof will be omitted.

The history unit 20 includes a buffer unit 21, a history storage unit 22, and a processing unit 23. The buffer unit 21 is a storage device capable of storing a single DLLP and is, for example, a register. The history storage unit 22 is implemented by, for example, a RAM (random access memory). The history storage unit 22 stores, for example, an application program and data used for processes in the processing unit 23. For example, the history storage unit 22 stores, as an application program, a history storage program for executing a history storing process that stores the TLP and the DLLP acquired from the PCI Express receiving unit 10. The history storage program may be installed in the history storage unit 22 from a computer-readable portable recording medium such as a CD-ROM or a DVD-ROM by using, for example, a known set-up program.

The processing unit 23 includes one or multiple processors and a peripheral circuit thereof. The processing unit 23 collectively controls the overall operation of the history unit 20 and is, for example, a CPU. The processing unit 23 controls the operation of, for example, the buffer unit 21 such that various processes of the history unit 20 are executed in an appropriate procedure according to, for example, a program stored in the history storage unit 22. The processing unit 23 executes a process based on the program stored in the history storage unit 22 (e.g., driver program, operating system program, or application program).

Figure 2:
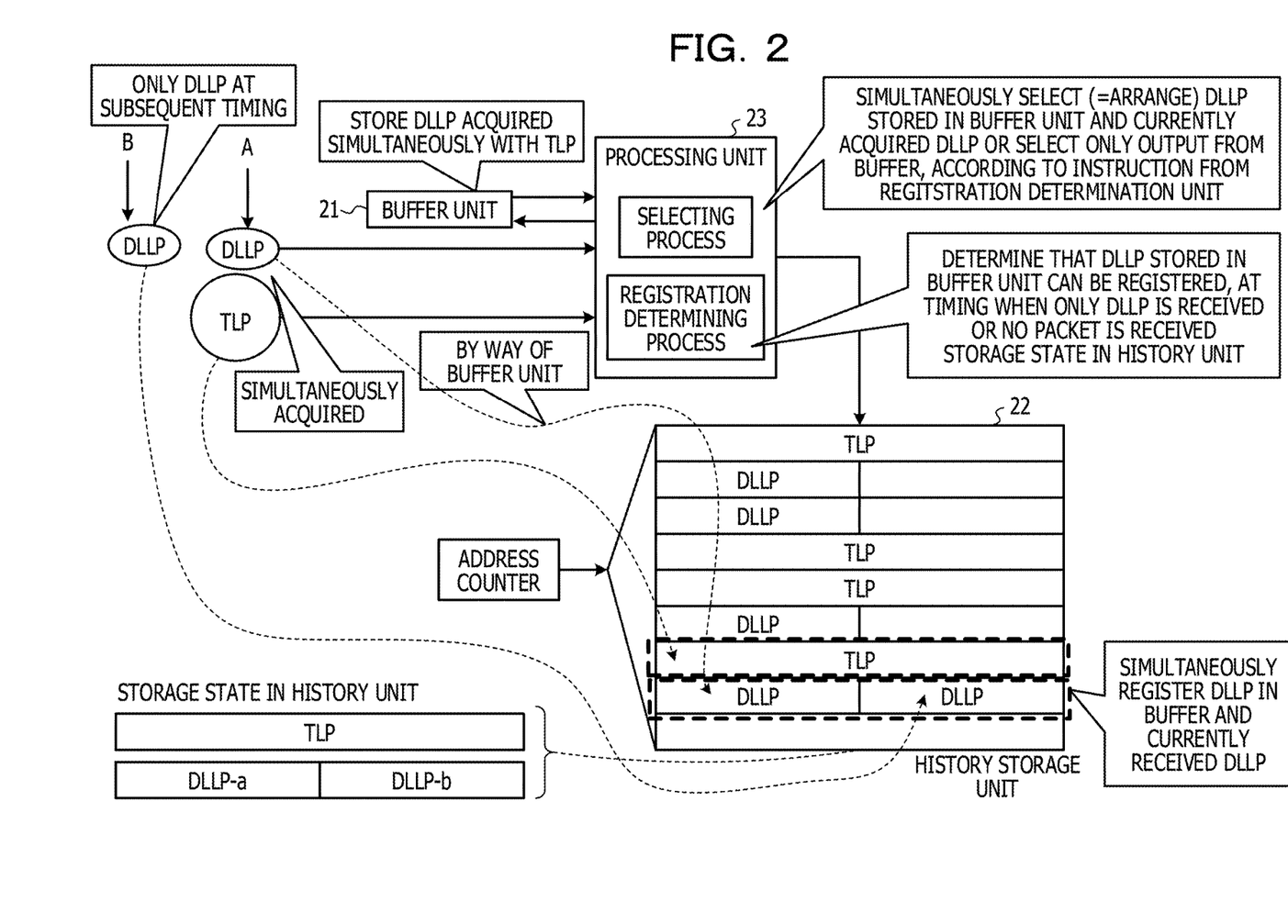
FIG. 2 is a view for explaining a history storing process by a processing unit illustrated in FIG. 1B.

FIG. 2 is a view for explaining the history storing process by the processing unit.

The processing unit 23 acquires the TLP and the DPPL simultaneously from the PCI Express receiving unit 10 at a first timing indicated by the arrow A. Then, the processing unit 23 acquires the DPPL from the PCI Express receiving unit 10 at a second timing indicated by the arrow B.

When the TLP and the DPPL are simultaneously acquired at the first timing, the processing unit 23 writes the DLLP to the buffer unit 21 and writes the TLP to the history storage unit 22. Then, when the DPPL is acquired at the second timing, the processing unit 23 simultaneously writes the DLLP acquired at the first timing and written to the buffer unit 21 and the DLLP acquired at the second timing, to the history storage unit 22.

Since the processing unit 23 temporarily writes the DLLP acquired simultaneously with the TLP at the first timing to the buffer unit 21, and then, writes the DLLP to the history storage unit 22 at the second timing, it is possible to write the simultaneously acquired DLLP and TLP to the history storage unit 22.

Figure 3:
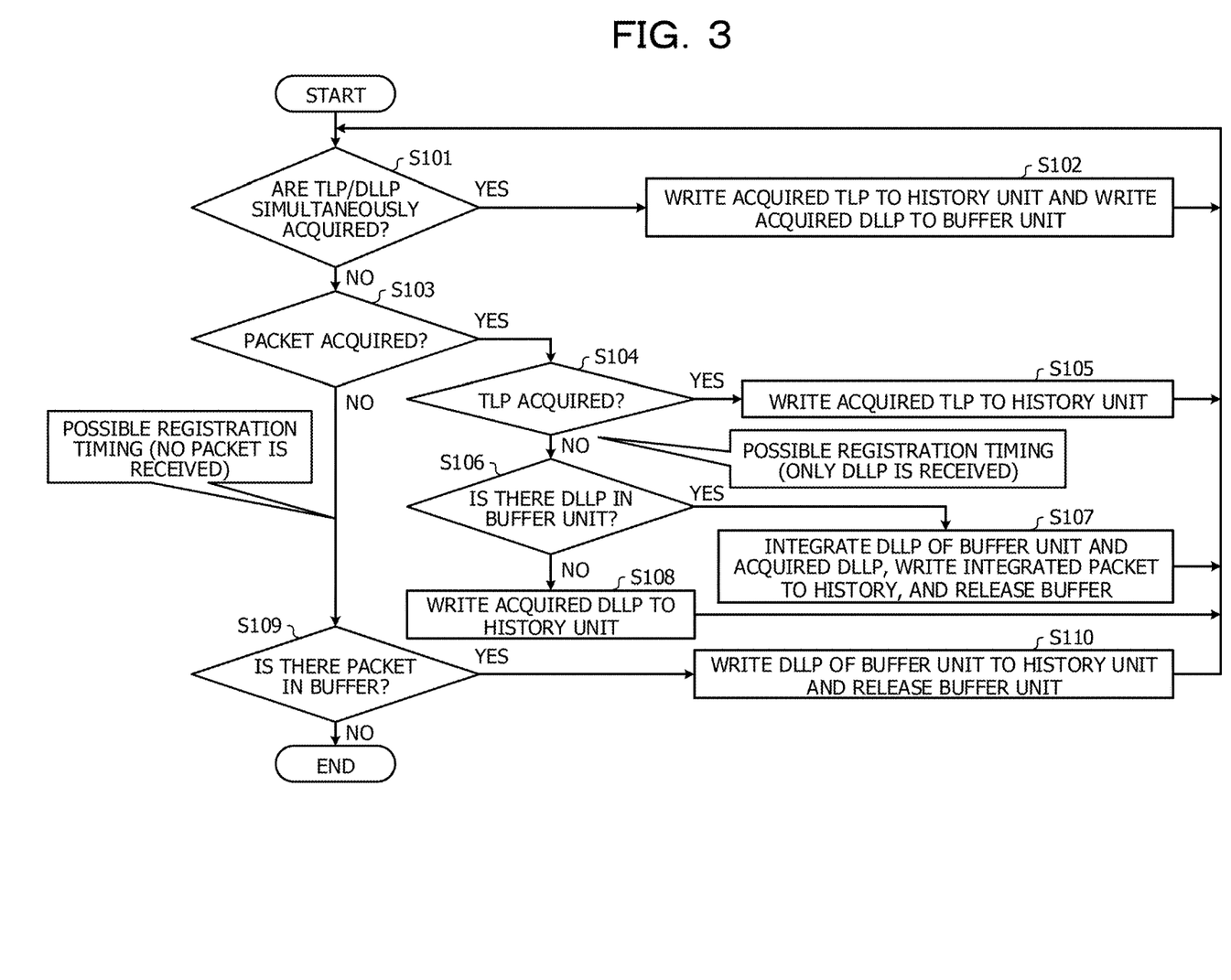
FIG. 3 is a flowchart of the history storing process that is executed by the processing unit illustrated in FIG. 1B.

FIG. 3 is a flowchart of the history storing process that is executed by the processing unit 23. The processing unit 23 executes the history storing process illustrated in FIG. 3 in each predetermined execution period.

First, the processing unit 23 determines whether the TLP and the DLLP have been simultaneously acquired from the PCI Express receiving unit 10 (S101). When it is determined that the TLP and the DLLP have been simultaneously acquired ("YES" in S101), the processing unit 23 writes the acquired DLLP to the buffer unit 21 and writes the acquired TLP to the history storage unit 22 (S102). Then, the process returns to S101.

When it is determined that the TLP and the DLLP have not been simultaneously acquired ("NO" in S101), the processing unit 23 determines whether any one packet of the TLP and the DLLP has been acquired (S103). When it is determined that any one packet of the TLP and the DLLP has been acquired ("YES" in S103), the processing unit 23 determines whether the acquired packet is the TLP (S104). When it is determined that the acquired packet is the TLP ("YES" in S104), the processing unit 23 writes the acquired TLP to the history storage unit 22 (S105). Then, the process returns to S101.

When it is determined that the acquired packet is the DLLP, rather than the TLP ("NO" in S104), the processing unit 23 determines whether the DLLP has been stored in the buffer unit 21 (S106). When it is determined that the DLLP has been stored in the buffer unit 21 ("YES" in S106), the processing unit 23 writes the DLLP stored in the buffer unit 21 and the acquired DLLP to the history storage unit 22 (S107). The DLLP written to the history storage unit 22 is deleted from the buffer unit 21, and the buffer unit 21 is released. Then, the process returns to S101.

When it is determined that the DLLP has not been stored in the buffer unit 21 ("NO" in S106), the processing unit 23 writes the acquired DLLP to the history storage unit 22 (S108). Then, the process returns to S101.

When it is determined that neither the TLP nor the DLLP has been acquired ("NO" in S103), the processing unit 23 determines whether the DLLP has been stored in the buffer unit 21 (S109). When it is determined that the DLLP has been stored in the buffer unit 21 ("YES" in S109), the processing unit 23 writes the DLLP stored in the buffer unit 21 to the history storage unit 22 (S110). The DLLP written to the history storage unit 22 is deleted from the buffer unit 21, and the buffer unit 21 is released. Then, the process returns to S101.

When the processing unit 23 determines that the DLLP has not been stored in the buffer unit 21 ("NO" in S109), the process is ended.

Operational Effect of Data Receiving Apparatus According to First Embodiment

Since the history unit 20 of the data receiving apparatus 1 temporarily writes the DLLP acquired simultaneously with the TLP to the buffer unit 21, and writes the DLLP to the history storage unit 22 at the next timing, it is possible to store the simultaneously acquired DLLP and TLP.

Data Receiving Apparatus According to Second Embodiment

Figure 4A:
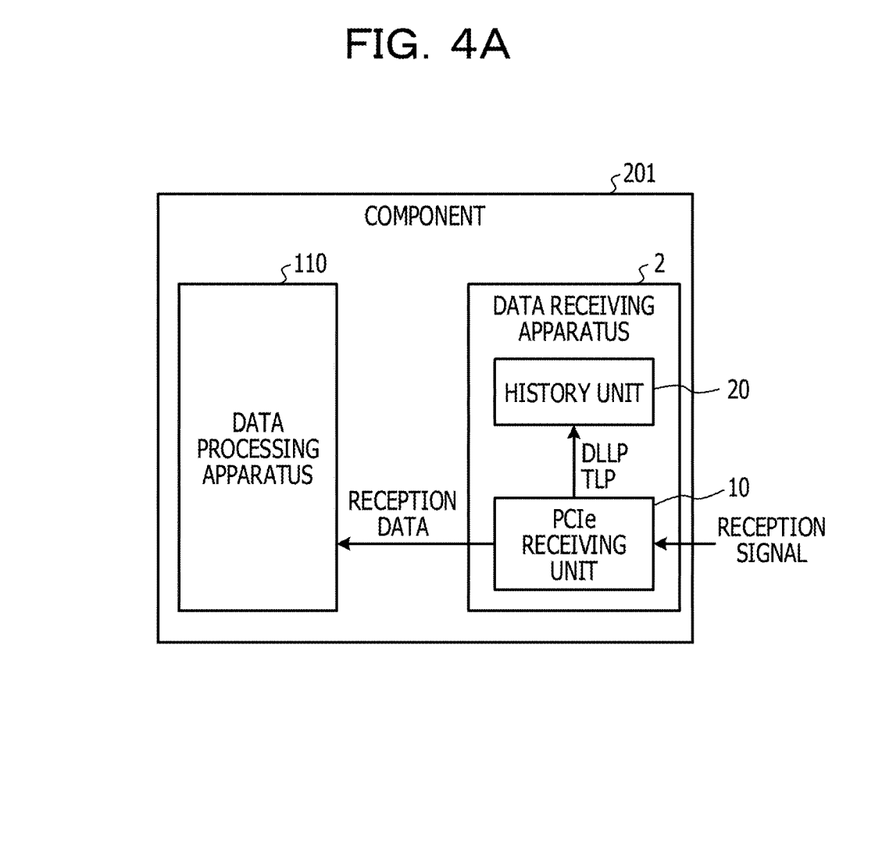
FIG. 4A is a block diagram of a component equipped with a data receiving apparatus according to a second embodiment.
Figure 4B:
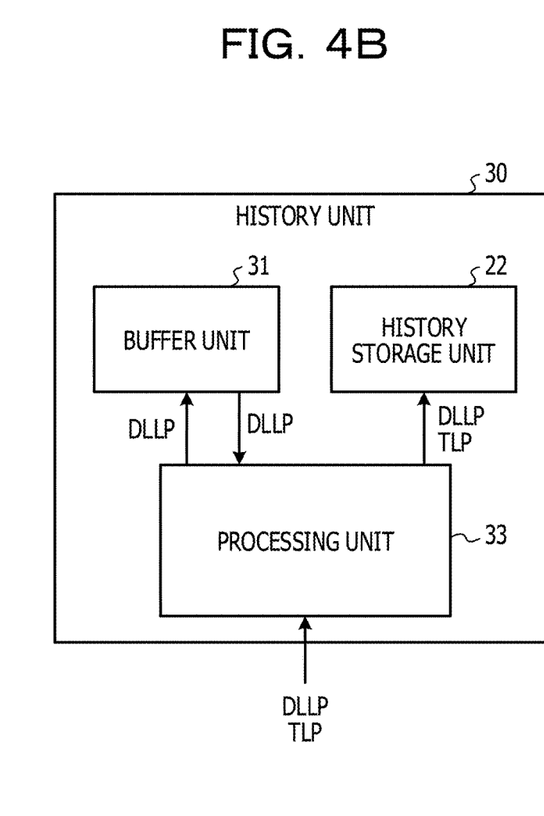
FIG. 4B is a block diagram of a history unit included in the data receiving apparatus illustrated in FIG. 4A.

FIG. 4A is a block diagram of a component equipped with a data receiving apparatus according to a second embodiment, and FIG. 4B is a block diagram of a history unit included in the data receiving apparatus illustrated in FIG. 4A.

A component 201 is different from the component 101 in that the component 201 includes a data receiving apparatus 2, in place of the data receiving apparatus 1. The data receiving apparatus 2 is different from the data receiving apparatus 1 in that the data receiving apparatus 2 includes a buffer unit 31 and a processing unit 33, in place of the buffer unit 21 and the processing unit 23. Since the configuration and function of the component 201, other than the buffer unit 31 and the processing unit 33, are the same as those of the component 101 which are denoted by the same reference numerals as those of the component 201, detailed description thereof will be omitted.

The buffer unit 31 is a storage device capable of storing multiple DLLPs, rather than a single DLLP and is, for example, a register.

The processing unit 33 includes one or multiple processors and a peripheral circuit thereof. The processing unit 33 collectively controls the overall operation of the history unit 30 and is, for example, a CPU. The processing unit 33 controls the operation of, for example, the buffer unit 31 such that various processes of the history unit 30 are executed in an appropriate procedure according to, for example, a program stored in the history storage unit 22. The processing unit 33 executes a process based on the program stored in the history storage unit 22 (e.g., driver program, operating system program, or application program).

Figure 5A:
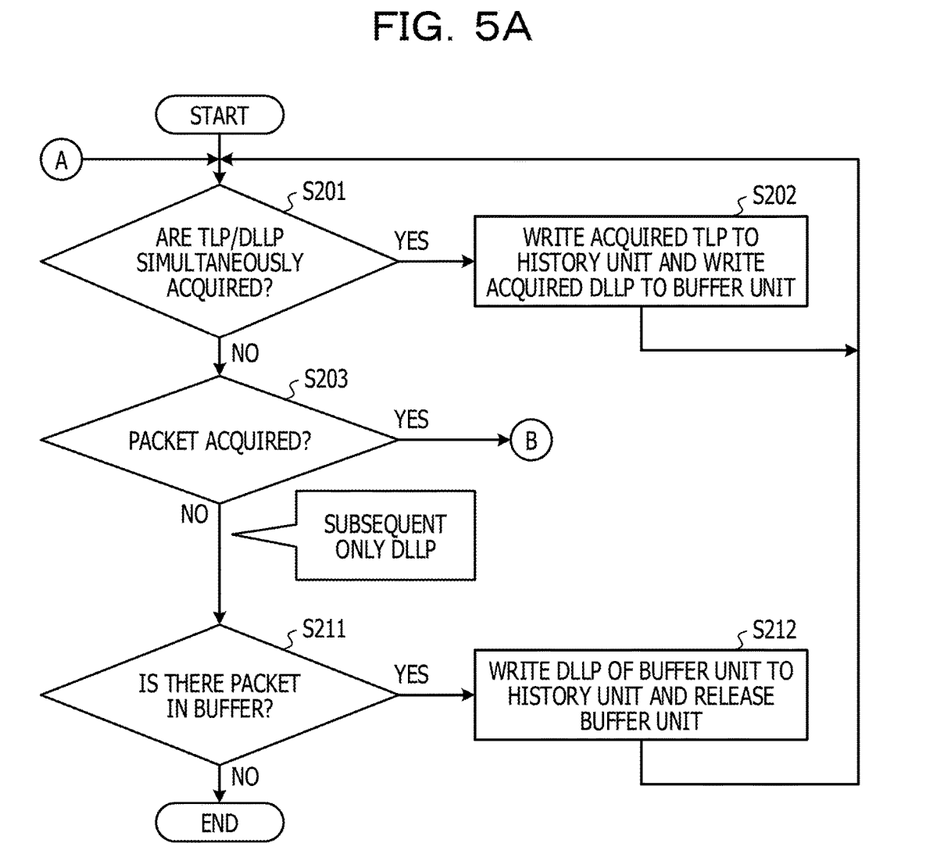
FIGS. 5A and 5B are a flowchart of a history storing process that is executed by a processing unit illustrated in FIG. 4B.
Figure 5B:
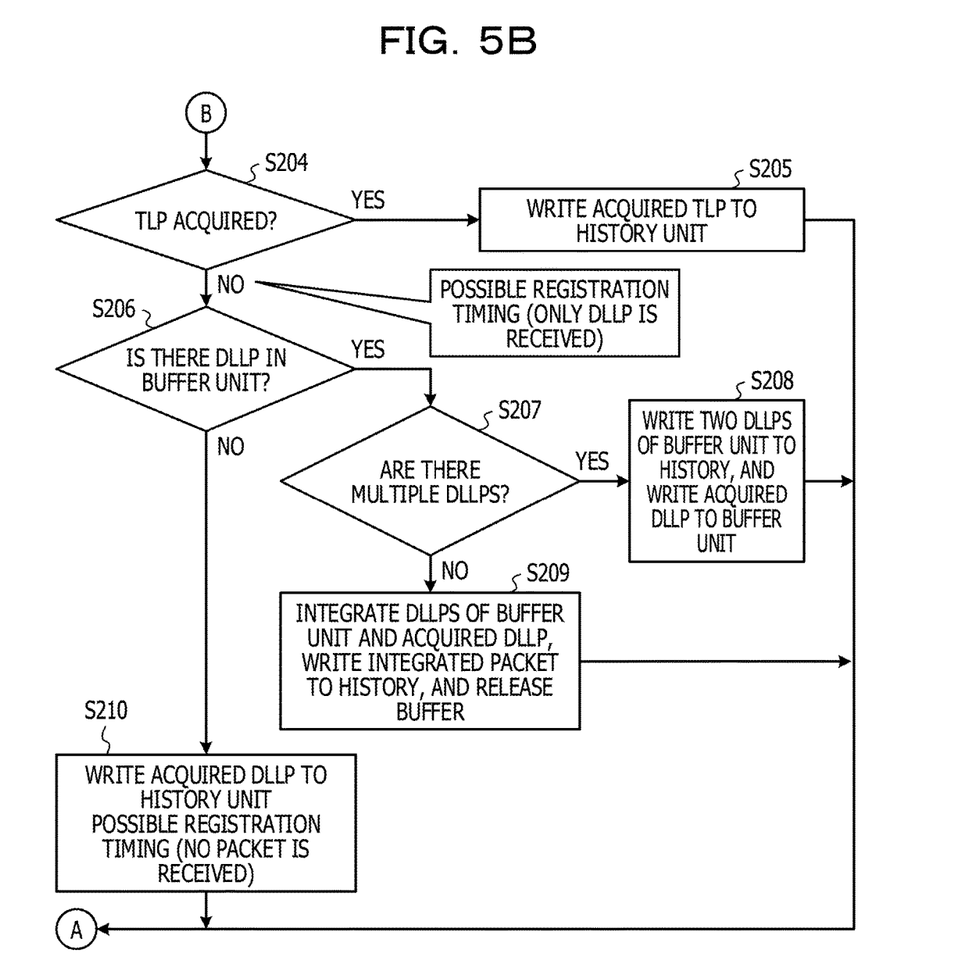

FIGS. 5A and 5B are a flowchart of the history storing process that is executed by the processing unit 33. The processing unit 33 executes the history storing process illustrated in FIGS. 5A and 5B in each predetermined execution period.

Since the processes of S201 to S206 are similar to the processes of S101 to S106, respectively, detailed descriptions thereof will be omitted. When it is determined that the DLLP has been stored in the buffer unit 31 ("YES" in S206), the processing unit 33 determines whether multiple DLLPs have been stored in the buffer unit 31 (S207). When it is determined that multiple DLLPs have been stored in the buffer unit 31 ("YES" in S207), the processing unit 33 writes two DLLPs stored in the buffer unit 31 to the history storage unit 22, and stores the acquired DLLP to the buffer unit 31 (S208). Then, the process returns to S201.

When it is determined that a single DLLP has been stored in the buffer unit 31 ("YES" in S207), the processing unit 33 writes the DLLP stored in the buffer unit 31 and the acquired DLLP to the history storage unit 22 (S209). The DLLPs written to the history storage unit 22 are deleted from the buffer unit 31, and the buffer unit 31 is released. Then, the process returns to S201. Since the processes of S210 to S212 are similar to the processes of S108 to S110, detailed descriptions thereof will be omitted.

Operational Effect of Data Receiving Apparatus According to Second Embodiment

The history unit 30 of the data receiving apparatus 2 is capable of temporarily storing multiple DLLPs, so that even when the TLP and the DLLP are simultaneously acquired over multiple times, it is possible to store the simultaneously acquired DLLP and TLP.

Data Receiving Apparatus According to Third Embodiment

Figure 6A:
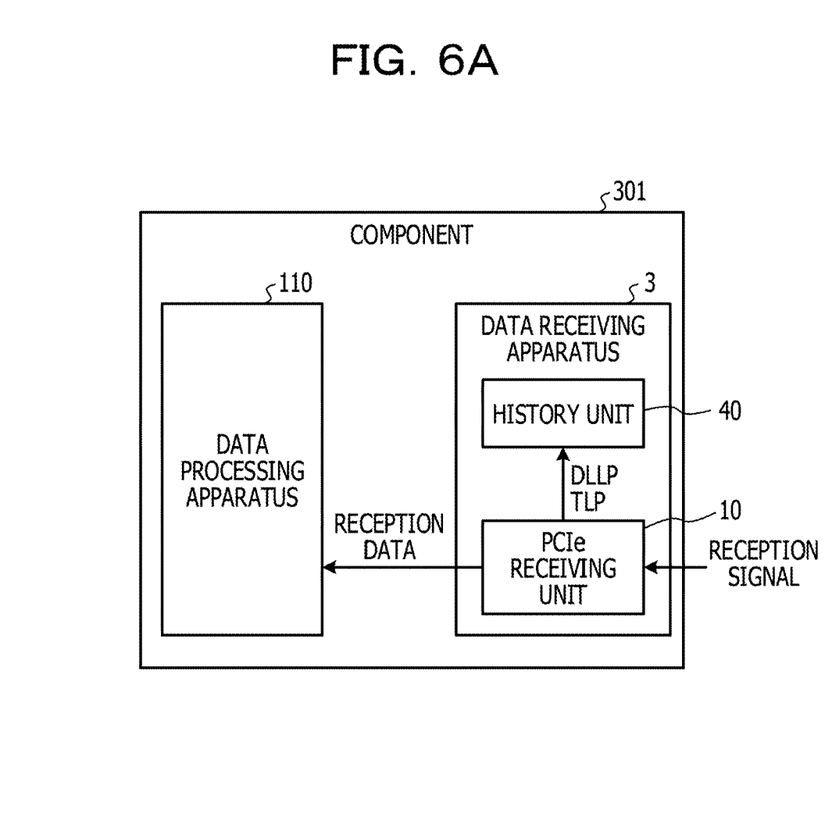
FIG. 6A is a block diagram of a component equipped with a data receiving apparatus according to a third embodiment.
Figure 6B:
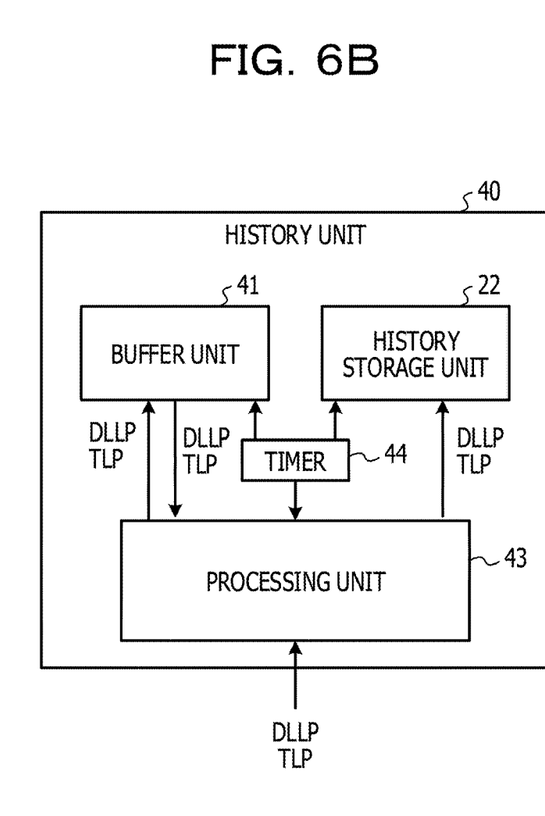
FIG. 6B is a block diagram of a history unit included in the data receiving apparatus illustrated in FIG. 6A.

FIG. 6A is a block diagram of a component equipped with a data receiving apparatus according to a third embodiment, and FIG. 6B is a block diagram of a history unit included in the data receiving apparatus illustrated in FIG. 6A.

A component 301 is different from the component 101 in that the component 301 includes a data receiving apparatus 3, in place of the data receiving apparatus 1. The data receiving apparatus 3 is different from the data receiving apparatus 1 in that the data receiving apparatus 3 includes a buffer unit 41 and a processing unit 43, in place of the buffer unit 21 and the processing unit 23. Further, the data receiving apparatus 3 is different from the data receiving apparatus 1 in that the data receiving apparatus 3 includes a timer 44. Since the configuration and function of the component 301, other than the buffer unit 41, the processing unit 43, and the timer 44, are the same as those of the component 101 which are denoted by the same reference numerals as those of the component 301, detailed description thereof will be omitted.

The buffer unit 41 is a storage device capable of storing multiple TLPs and multiple DLLPs, rather than a single DLLP, and is, for example, a register.

The processor 43 includes one or multiple processors and a peripheral circuit thereof. The processing unit 43 collectively controls the overall operation of the history unit 40 and is, for example, a CPU. The processing unit 43 controls the operations of, for example, the buffer unit 41 and the timer 44 such that various processes of the history unit 40 are executed in an appropriate procedure according to, for example, a program stored in the history storage unit 22. The processing unit 43 executes a process based on the program stored in the history storage unit 22 (e.g., driver program, operating system program, or application program).

The timer 44 includes an oscillation circuit (not illustrated), clocks time, and outputs time information indicating the clocked time to the buffer unit 41, the history storage unit 22, and the processing unit 43.

Figure 7:
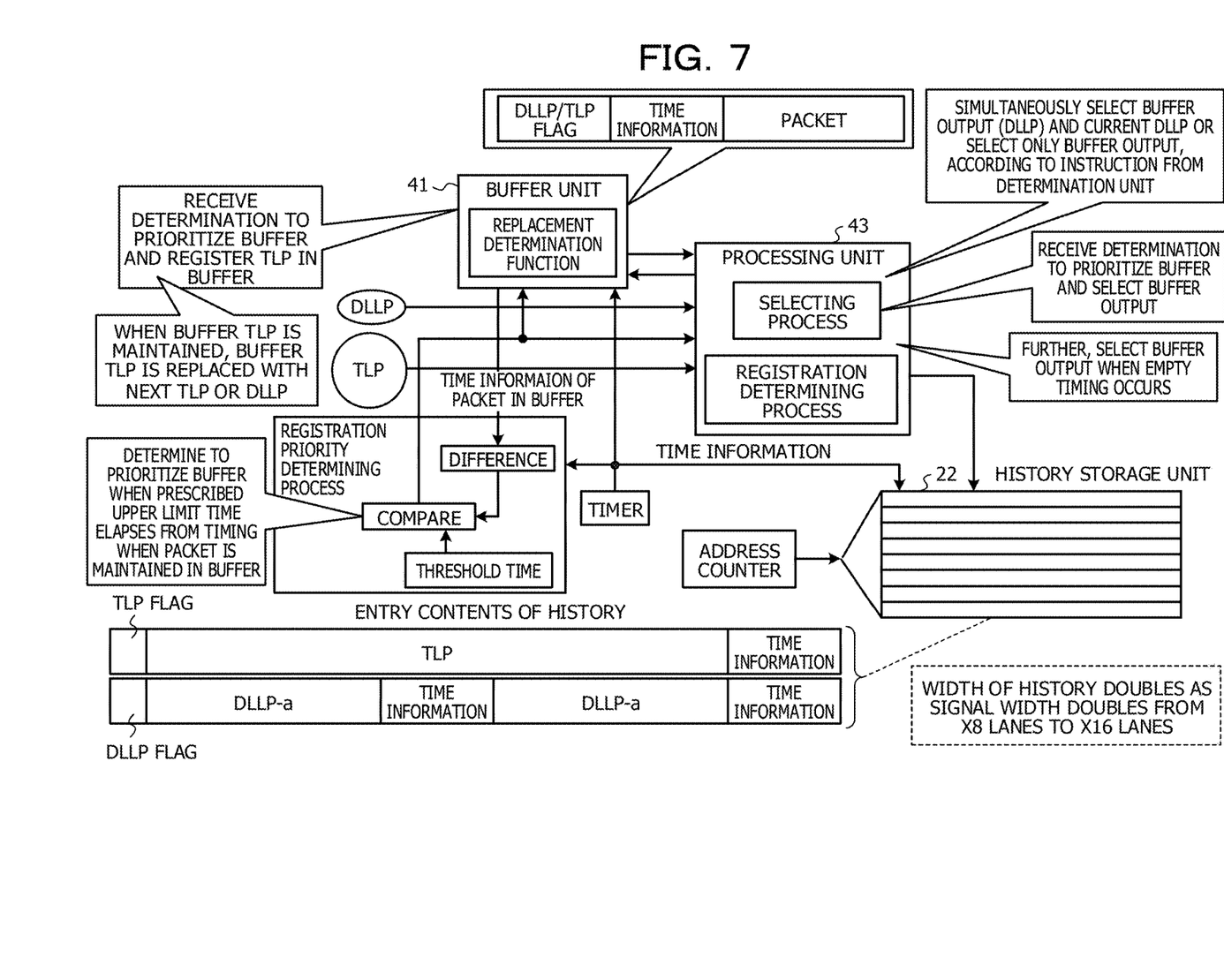
FIG. 7 is a view for explaining the history storing process by the processing unit illustrated in FIG. 6B.

FIG. 7 is a view for explaining the history storing process by the processing unit 43. In FIG. 7, for the simplification of description, a registration priority determining process which is a part of the process of the processing unit 43 will be described separately from the processing unit 43. In addition, the registration priority determining process may be executed by a device separate from the processing unit 43.

Based on the time information input from the timer 44, the processing unit 43 executes the registration priority determining process that determines which of the acquired TLP and the DLLP stored in the buffer unit 41 is to be written to the history storage unit 22.

In the registration priority determining process, the processing unit 43 compares a difference between the time when the DLLP stored in the buffer unit 41 was written and the current time clocked by the timer, with a predetermined threshold time. When the time when the DLLP was written exceeds the threshold time, the processing unit 43 writes the DLLP stored in the buffer unit 41 to the history storage unit 22 prior to the acquired TLP. When the time when the DLLP was written is equal to or shorter than the threshold time, the processing unit 43 writes the acquired TLP to the history storage unit 22. When writing a packet to the history storage unit 22, the processing unit 43 associates the packet to be written with packet information indicating either the TLP or the DLLP and time information indicating the acquisition time of the packet.

Since the processing unit 43 associates the packet to be written to the history storage unit 22 with the time information indicating the acquisition time, it is possible to accurately grasp the order of acquiring the packet even when the writing order is reversed. Further, since the processing unit 43 associates the packet to be written to the history storage unit 22 with the packet information indicating either the TLP or the DLLP, it is possible to accurately grasp which of the TLP and the DLLP corresponds to the packet to be stored in the history storage unit 22.

Figure 8A:
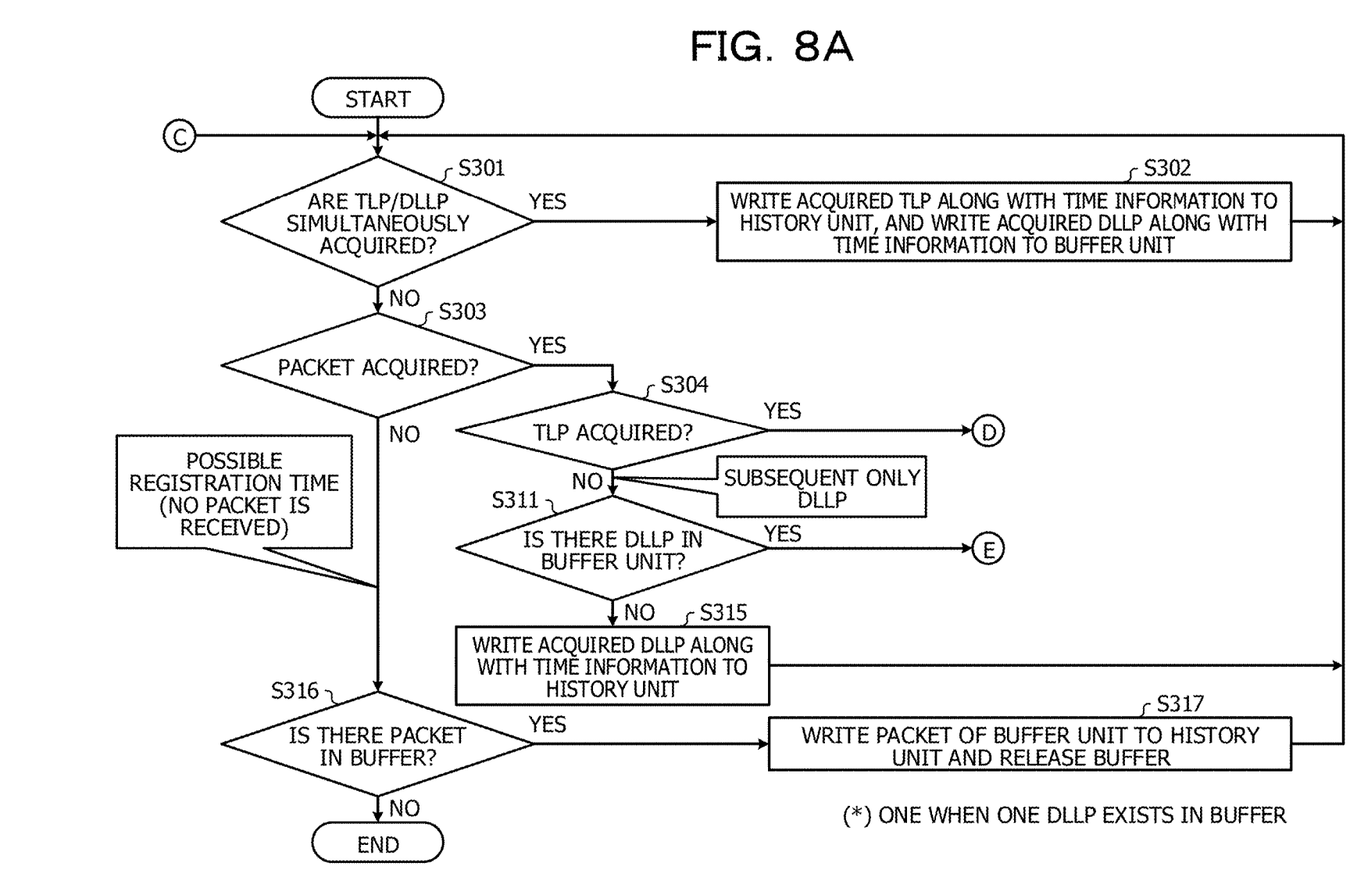
FIGS. 8A and 8B are a flowchart of the history storing process that is executed by the processing unit illustrated in FIG. 6B.
Figure 8B:
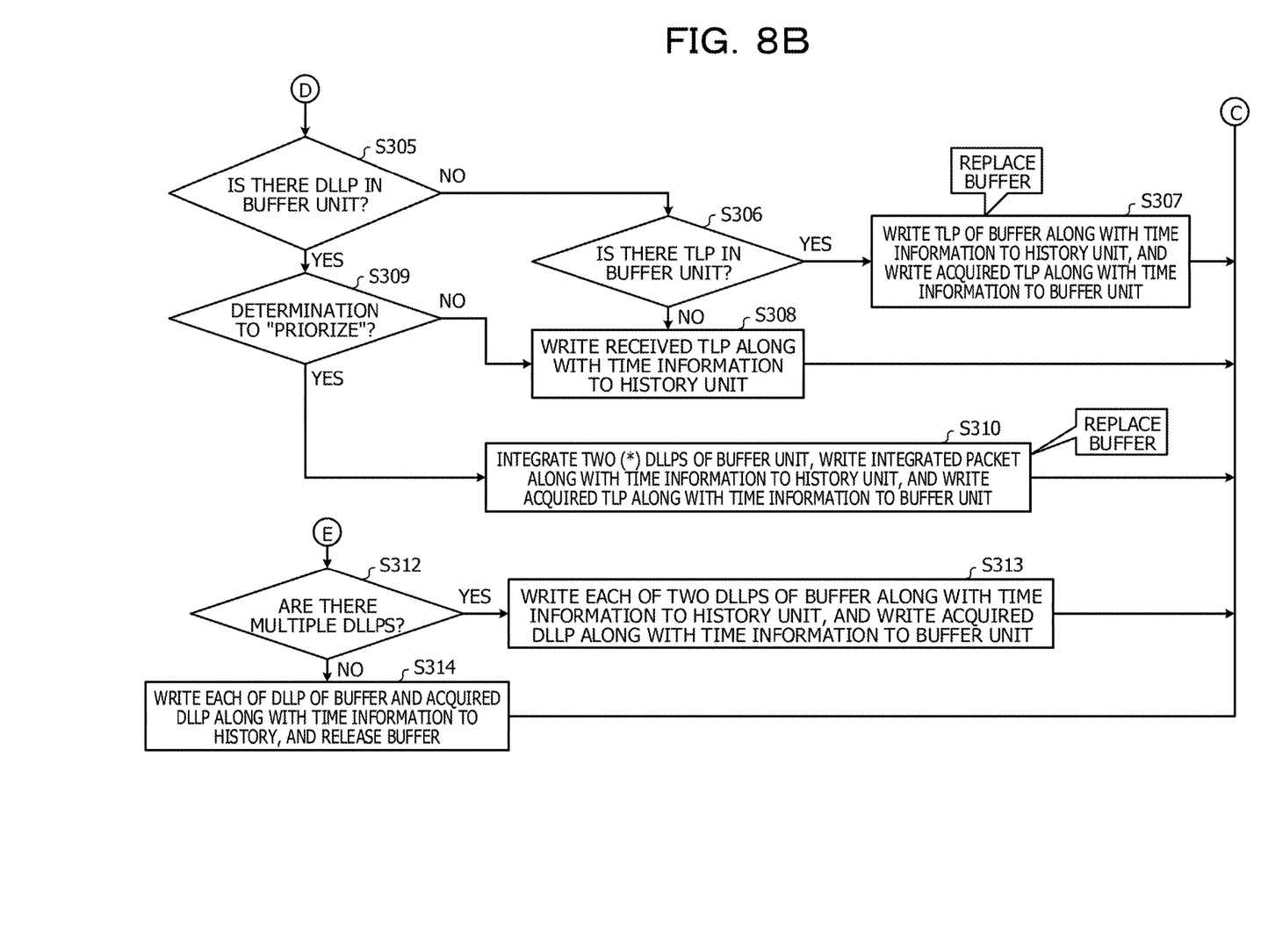

FIGS. 8A and 8B are a flowchart of the history storing process that is executed by the processing unit 43. The processing unit 43 executes the history storing process illustrated in FIGS. 5A and 5B in each predetermined execution period.

First, the processing unit 43 determines whether the TLP and the DLLP have been simultaneously acquired from the PCI Express receiving unit 10 (S301). When it is determined that the TLP and the DLLP have been simultaneously acquired ("YES" in S301), the processing unit 43 writes the acquired DLLP to the buffer unit 41 and writes the acquired TLP to the history storage unit 22 (S302). When writing the acquired DLLP to the buffer unit 41, the processing unit 43 associates the DLLP with the time information input from the timer 44 and the packet information indicating the DLLP. In addition, when writing the acquired TLP to the history storage unit 22, the processing unit 43 associates the TLP with the time information input from the timer and the packet information indicating the TLP. Then, the process returns to S301.

When it is determined that the TLP and the DLLP have not been simultaneously acquired ("NO" in S301), the processing unit 43 determines whether any one packet of the TLP and the DLLP has been acquired (S303). When it is determined that any one packet of the TLP and the DLLP has been acquired ("YES" in S303), the processing unit 43 determines whether the acquired packet is the TLP (S304).

When it is determined that the acquired packet is the TLP ("YES" in S304), the processing unit 43 determines whether the DLLP has been stored in the buffer unit 41 (S305). When it is determined that the DLLP has not been stored in the buffer unit 41 ("NO" in S305), the processing unit 43 determines whether the TLP has been stored in the buffer unit 41 (S306). When it is determined that the TLP has been stored in the buffer unit 41 ("YES" in S306), the processing unit 43 writes the TLP stored in the buffer unit 41 to the history storage unit 22, and writes the acquired TLP to the history storage unit 22 (S307). The TLP written to the history storage unit 22 is deleted from the buffer unit 41. When writing the acquired TLP to the history storage unit 22, the processing unit 43 associates the TLP with the time information input from the timer 44 and the packet information indicating the TLP. Further, when writing the TLP stored in the buffer unit 41 to the history storage unit 22, the processing unit 43 associates the TLP with the time information input from the timer and the packet information indicating the TLP. Then, the process returns to S301.

When it is determined that the TLP has not been stored in the buffer unit 41 ("NO" in S306), the processing unit 43 writes the acquired TLP to the history storage unit 22 (S308). When writing the acquired TLP to the history storage unit 22, the processing unit 43 associates the TLP with the time information input from the timer 44 and the packet information indicating the TLP. Then, the process returns to S301.

When it is determined that the DLLP has been stored in the buffer unit 41 ("YES" in S305), the processing unit 43 executes the registration priority determining process to determine whether the write of the TLP stored in the buffer unit 41 is prioritized (S309). Specifically, the processing unit 43 compares a difference between the time when the DLLP stored in the buffer unit 41 was written and the current time clocked by the timer, with a predetermined threshold time. When the time when the DLLP was written exceeds the threshold time, the processing unit 43 writes the DLLP stored in the buffer unit 41 to the history storage unit 22 prior to the acquired TLP and DLLP.

The processing unit 43 executes the registration priority determining process, and when it is determined that the write of the DLLP stored in the buffer unit 41 is not prioritized ("NO" in S309), the processing unit 43 writes the acquired TLP to the history storage unit 22 (S308). Then, the process returns to S301.

When it is determined that the DLLP stored in the buffer unit 41 is prioritized ("YES" in S309), the processing unit 43 writes the DLLP stored in the buffer unit 41 to the history storage unit 22 (S110). The DLLP written to the history storage unit 22 is deleted from the buffer unit 41. Further, the processing unit 43 writes the acquired TLP to the history storage unit 22 (S310). When writing the acquired TLP to the history storage unit 22, the processing unit 43 associates the TLP with the time information input from the timer 44 and the packet information indicating the TLP. Further, when writing the DLLP stored in the buffer unit 41 to the history storage unit 22, the processing unit 43 associates the DLLP with the time information input from the timer and the packet information indicating the DLLP. When multiple DLLPs are stored in the buffer unit 41, the processing section 43 refers to the time information associated with the DLLPs and writes two DLLPs that have been written earliest, to the history storage unit 22. Then, the process returns to S301.

When it is determined that the acquired packet is the DLLP, rather than the TLP ("NO" in S304), the processing unit 43 determines whether the DLLP has been stored in the buffer unit 41 (S311). When it is determined that the DLLP has been stored in the buffer unit 41 ("YES" in S311), the processing unit 43 determines whether multiple DLLPs have been stored in the buffer unit 41 (S312). When it is determined that multiple DLLPs have been stored in the buffer unit 41 ("YES" in S312), the processing unit 43 writes two of the DLLPs stored in the buffer unit 41 to the history storage unit 22, and writes the acquired DLLP to the buffer unit 41 (S313). The DLLPs written to the history storage unit 22 are deleted from the buffer unit 41. When writing the acquired DLLP to the buffer unit 41, the processing unit 43 associates the DLLP with the time information input from the timer 44 and the packet information indicating the DLLP. Further, when writing the DLLPs stored in the buffer unit 41 to the history storage unit 22, the processing unit 43 associates the DLLPs with the time information input from the timer and the packet information indicating the DLLPs. The processing unit 43 refers to the time information associated with the DLLPs and writes two DLLPs that have been written earliest, to the history storage unit 22. Then, the process returns to S301.

When it is determined that multiple DLLPs have not been stored in the buffer unit 41 ("NO" in S312), the processing unit 43 writes the acquired DLLP and the DLLP stored in the buffer unit 41 to the history storage unit 22 (S314). When writing the acquired DLLP and the DLLP stored in the buffer unit 41 to the history storage unit 22, the processing unit 43 associates the DLLPs with the time information input from the timer 44 and the packet information indicating the DLLPs. Then, the process returns to S301.

When it is determined that the DLLP has not been stored in the buffer unit 41 ("NO" in S311), the processing unit 43 writes the acquired DLLP to the history storage unit 22 (S315). When writing the acquired DLLP to the history storage unit 22, the processing unit 43 associates the DLLP with the time information input from the timer 44 and the packet information indicating the DLLP. Then, the process returns to S301.

When it is determined that neither the TLP nor the DLLP has been acquired ("NO" in S303), the processing unit 43 determines whether any one packet of the TLP and the DLLP has been stored in the buffer unit 41 (S316). When it is determined that any one packet of the TLP and the DLLP has been stored in the buffer unit 41 ("YES" in S316), the processing unit 43 writes the packet stored in the buffer unit 41 to the history storage unit 22 (S317). The DLLP written to the history storage unit 22 is deleted from the buffer unit 41, and the buffer unit 41 is released. When writing the TLP stored in the buffer unit 41 to the history storage unit 22, the processing unit 41 associates the TLP with the time information input from the timer 44 and the packet information indicating the TLP. Further, when writing the DLLP stored in the buffer unit 22 to the history storage unit 22, the processing unit 43 associates the DLLP with the time information input from the timer 44 and the packet information indicating the DLLP. Then, the process returns to S301.

When the processing unit 23 determines that the DLLP has not been stored in the buffer unit 21 ("NO" in S316), the process is ended.

Operational Effect of Data Receiving Apparatus According to Third Embodiment

Since the history unit 40 of the data receiving apparatus 3 associates the packet to be written to the history storage unit 22 with the time information indicating the acquisition time of the packet, it is possible to accurately grasp the order of acquiring the packet even when the writing order is reversed.

Since the history unit 40 of the data receiving apparatus 3 associates the packet to be written with the packet information indicating that the packet is either the TLP or the DLLP, it is possible to accurately grasp which of the TLP and the DLLP corresponds to the packet to be stored in the history storage unit 22.

Figure 9:
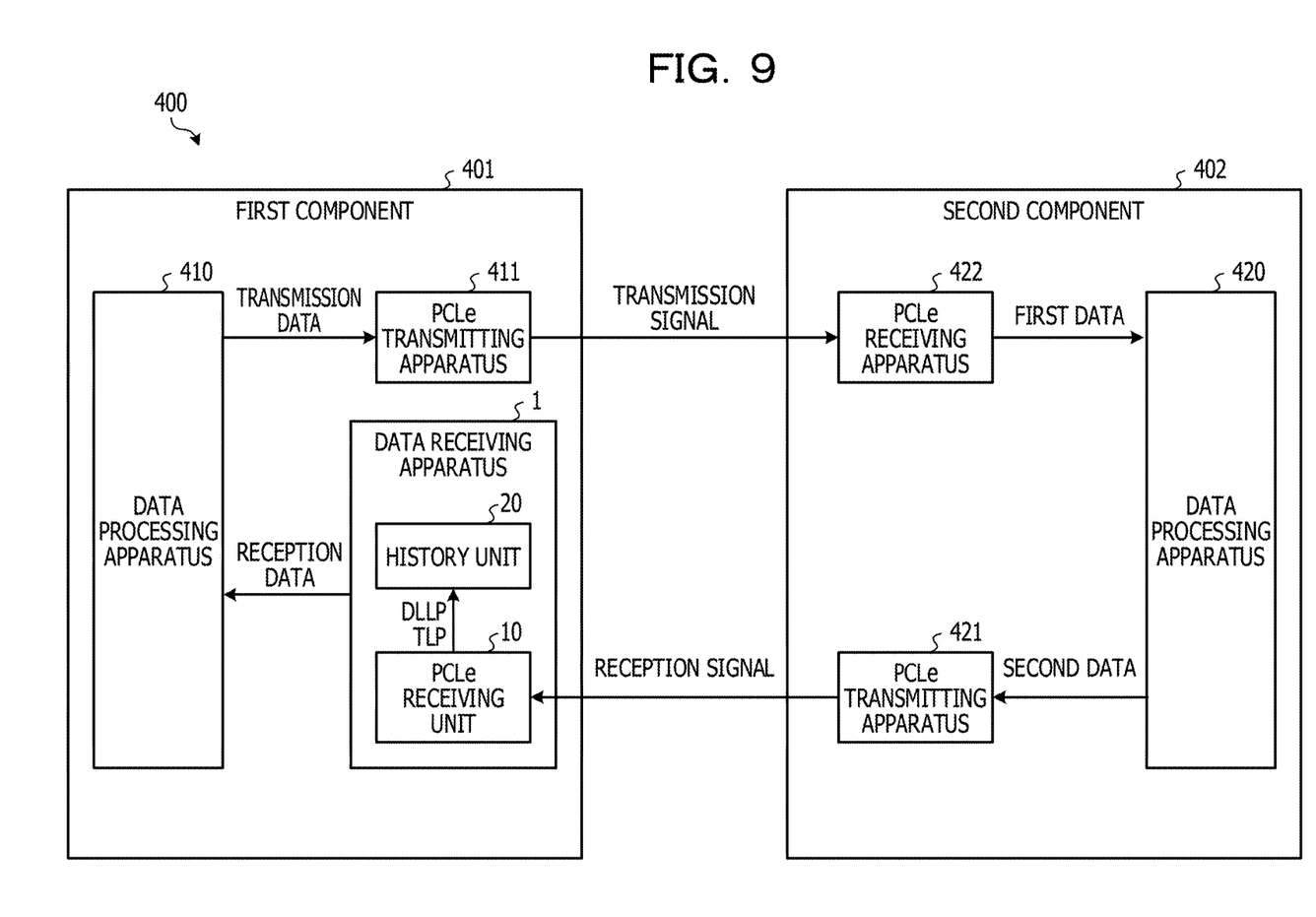
FIG. 9 is a block diagram of a data transmission/reception system including a data receiving apparatus according to an embodiment.

Data Transmission/Reception System Including Data Receiving Apparatus According to Embodiments FIG. 9 is a block diagram of a data transmission/reception system including the data receiving apparatus according to the embodiments.

A data transmission/reception system 400 includes a first component 401 and a second component 402. The first component 401 and the second component 402 communicate with each other according to the PCIe standard. The first component 401 is an end point, and the second component 402 is a root complex of a host.

The first component 401 includes a data receiving apparatus 1 that receives a reception signal transmitted from the second component 402, a data processing unit 410, and a PCI Express transmitting apparatus 411. The data processing unit 410 executes a predetermined process on reception data corresponding to the reception signal received by the data receiving apparatus 1. Further, the data processing unit 410 outputs transmission data generated by executing the predetermined process to the PCI Express transmitting apparatus 411. The PCI Express transmitting apparatus 411 generates a transmission signal according to the PCIe standard from the transmission data input from the data processing unit 410, and transmits the generated transmission signal to the second component 402. Since the operation and function of the PCI Express transmitting apparatus 411 are well-known, detailed descriptions thereof will be omitted.

The second component 402 includes a data processing apparatus 420, a PCI Express transmitting apparatus 421, and a PCI Express receiving unit 422. The data processing apparatus 420 executes a predetermined process on first data corresponding to the transmission signal received by the PCI Express receiving unit 422. Further, the data processing apparatus 420 outputs second data generated by executing the predetermined process to the PCI Express transmitting apparatus 421. The PCI Express transmitting apparatus 421 generates a reception signal according to the PCIe standard from the second data input from the data processing apparatus 420, and transmits the generated reception signal to the first component 401. The PCI Express receiving unit 422 generates first data according to the PCIe standard from the transmission signal transmitted from the first component 401, and outputs the generated first data to the data processing apparatus 420. Since the operations and functions of the PCI Express transmitting apparatus 421 and the PCI Express receiving unit 422 are well-known, detailed descriptions thereof will be omitted.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A data receiving apparatus comprising:
a memory; and
a processor coupled to the memory and the processor configured to:
extract reception data, a header of a transaction layer packet, and a data link layer packet which are included in a received reception signal;
store the data link layer packet in a buffer;
store the header of the transaction layer packet and the data link layer packet in a history storage;
write the data link layer packet to the buffer when the header of the transaction layer packet and the data link layer packet are simultaneously acquired;
write the data link layer packet stored in the buffer to the history storage when the header of the transaction layer packet and the data link layer packet is not acquired or when the data link layer packet is acquired without acquiring the header of the transaction layer packet.

2. The data receiving apparatus according to claim 1, wherein when both the header of the transaction layer packet and the data link layer packet are simultaneously acquired, the processor writes the header of the transaction layer packet to the history storage.

3. The data receiving apparatus according to claim 1, wherein when the header of the transaction layer packet is acquired, the processor writes the header of the transaction layer packet in association with an acquisition time of the transaction layer packet to one of the buffer and the history storage.

4. The data receiving apparatus according to claim 3, wherein when another data link layer packet is acquired while the data link layer packet is stored in the buffer, the processor simultaneously writes the data link layer packet stored in the buffer and the acquired another data link layer packet to the history storage.

5. The data receiving apparatus according to claim 4, wherein when the header of the transaction layer packet is acquired while the data link layer packet is stored in the buffer, in a case where an elapsed time from a time when the data link layer packet stored in the buffer has been acquired exceeds a threshold time, the processor writes the data link layer packet stored in the buffer to the history storage, and writes the header of the transaction layer packet to the buffer.

6. The data receiving apparatus according to claim 4, wherein when the header of the transaction layer packet is acquired while the data link layer packet is stored in the buffer, in a case where an elapsed time from the time when the data link layer packet stored in the buffer has been acquired is equal to or shorter than a threshold time, the processor writes the acquired header of the transaction layer packet in association with the acquisition time of the transaction layer packet to the history storage.

7. The data receiving apparatus according to claim 3, wherein when another header of the transaction layer packet is acquired while the header of the transaction layer packet is stored in the buffer, the processor writes the header of the transaction layer packet stored in the buffer to the history storage, and writes the acquired another header of the transaction layer packet in association with the acquisition time of the another header of the transaction layer packet to the buffer.

8. The data receiving apparatus according to claim 1, wherein the buffer is a data receiving apparatus capable of storing a plurality of data link layer packets.

9. A data transmission and reception system comprising:
a transmitting apparatus; and
a receiving apparatus,
wherein the receiving apparatus includes
a memory; and
a processor coupled to the memory and the processor configured to
extract reception data, a header of a transaction layer packet, and a data link layer packet which are included in a reception signal received from the transmitting apparatus;
store the data link layer packet in a buffer;
store the header of the transaction layer packet and the data link layer packet in a history storage;
write the data link layer packet to the buffer when the header of the transaction layer packet and the data link layer packet are simultaneously acquired, and write the data link layer packet stored in the buffer to the history storage when the header of the transaction layer packet and the data link layer packet is not acquired or when the data link layer packet is acquired without acquiring the header of the transaction layer packet.

10. The data transmission and reception system according to claim 9, wherein when both the header of the transaction layer packet and the data link layer packet are simultaneously acquired, the processor writes the header of the transaction layer packet to the history storage.

11. The data transmission and reception system according to claim 9, wherein when the header of the transaction layer packet is acquired, the processor writes the header of the transaction layer packet in association with an acquisition time of the transaction layer packet to one of the buffer and the history storage.

12. The data transmission and reception system according to claim 11, wherein when another data link layer packet is acquired while the data link layer packet is stored in the buffer, the processor simultaneously writes the data link layer packet stored in the buffer and the acquired another data link layer packet to the history storage.

13. The data transmission and reception system according to claim 12, wherein when the header of the transaction layer packet is acquired while the data link layer packet is stored in the buffer, in a case where an elapsed time from a time when the data link layer packet stored in the buffer has been acquired exceeds a threshold time, the processor writes the data link layer packet stored in the buffer to the history storage, and writes the header of the transaction layer packet to the buffer.

14. The data transmission and reception system according to claim 12, wherein when the header of the transaction layer packet is acquired while the data link layer packet is stored in the buffer, in a case where an elapsed time from the time when the data link layer packet stored in the buffer has been acquired is equal to or shorter than a threshold time, the processor writes the acquired header of the transaction layer packet in association with the acquisition time of the transaction layer packet to the history storage.

15. A method of controlling a data transmission and reception system including a transmitting apparatus and a receiving apparatus, the method comprising:
extracting, from a receiving unit of the receiving apparatus, reception data, a header of a transaction layer packet, and a data link layer packet which are included in a reception signal received from the transmitting apparatus,
storing the data link layer packet in a buffer of the receiving apparatus;

storing the header of the transaction layer packet and the data link layer packet in a history storage of the receiving apparatus;

writing the data link layer packet to the buffer when the header of the transaction layer packet and the data link layer packet are simultaneously acquired, and writing the data link layer packet stored in the buffer to the history storage when the header of the transaction layer packet and the data link layer packet is not acquired or when the data link layer packet is acquired without acquiring the header of the transaction layer packet.

16. The method according to claim 15, further comprising:

when both the header of the transaction layer packet and the data link layer packet are simultaneously acquired, writing the header of the transaction layer packet to the history storage.

17. The method according to claim 15, further comprising:

when the header of the transaction layer packet is acquired, writing the header of the transaction layer packet in association with an acquisition time of the transaction layer packet to one of the buffer and the history storage.

18. The method according to claim 17, further comprising:

when another data link layer packet is acquired while the data link layer packet is stored in the buffer, writing simultaneously the data link layer packet stored in the buffer and the acquired another data link layer packet to the history storage.

19. The method according to claim 18, further comprising:

when the header of the transaction layer packet is acquired while the data link layer packet is stored in the buffer, in a case where an elapsed time from a time when the data link layer packet stored in the buffer has been acquired exceeds a threshold time, writing the data link layer packet stored in the buffer to the history storage, and writing the header of the transaction layer packet to the buffer.

20. The method according to claim 18, further comprising:

when the header of the transaction layer packet is acquired while the data link layer packet is stored in the buffer, in a case where an elapsed time from the time when the data link layer packet stored in the buffer has been acquired is equal to or shorter than a threshold time, writing the acquired header of the transaction layer packet in association with the acquisition time of the transaction layer packet to the history storage.

\* \* \* \* \*